(12) United States Patent
Lee et al.

(10) Patent No.: US 6,833,219 B2
(45) Date of Patent: Dec. 21, 2004

(54) POLYMER ELECTROLYTES AND LITHIUM SECONDARY BATTERY CONTAINING THE SAME

(75) Inventors: Yong-boom Lee, Seoul (KR); Chool-soo Jung, Choonon (KR); Kyoung-hee Lee, Choonon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 410 days.

(21) Appl. No.: 10/036,465

(22) Filed: Jan. 7, 2002

(65) Prior Publication Data

US 2002/0114997 A1 Aug. 22, 2002

(30) Foreign Application Priority Data

Jan. 5, 2001 (KR) .................................. 10-2001-0000667

(51) Int. Cl.$^7$ ............................................. H01M 10/22
(52) U.S. Cl. ....................... 429/304; 429/306; 429/314; 252/301.16
(58) Field of Search ..................... 252/301.16, 301.6 R; 429/304, 306, 314, 324; 29/623.5

(56) References Cited

U.S. PATENT DOCUMENTS

| | | | |
|---|---|---|---|
| 5,279,910 A | 1/1994 | Sasaki et al. | 429/213 |
| 5,340,368 A | 8/1994 | Koksbang et al. | 29/623.5 |
| 5,437,942 A | 8/1995 | Murata et al. | 429/192 |
| 5,972,539 A | 10/1999 | Hasegawa et al. | 429/304 |

Primary Examiner—Randy Gulakowski
Assistant Examiner—Monique Wills
(74) Attorney, Agent, or Firm—Staas & Halsey, LLP.

(57) ABSTRACT

A polymer electrolyte for use in a lithium secondary battery prepared by polymerizing a composition including 0.1 to 90% by weight of a first compound represented by formula 1, a second compound represented by formula 2 or a mixture thereof, 0.1 to 90% by weight of a third compound represented by formula 3, and 9.8 to 99.8% by weight of a nonaqueous organic solvent containing 0.5 to 2.0 M of a lithium salt. Formula 1 is $CH(R1)=C(R2)-C(=O)O-R3-N(R4)(R5)$, Formula 2 is $CH(R1)=C(R2)-C(=O)O-R3-CN$, and Formula 3 is $Z-\{-Y-X-C(R2)=CH(R1)\}_n$.

31 Claims, 3 Drawing Sheets

POLYMER ELECTROLYTES AND LITHIUM SECONDARY BATTERY CONTAINING THE SAME

CROSS-REFERENCE TO RELATED APPLICATIONS

This application claims the benefit of Korean Application No. 2001-667, filed Jan. 5, 2001, in the Korean Industrial Property Office, the disclosure of which is incorporated herein by reference.

BACKGROUND OF THE INVENTION

1. Field of the Invention

The present invention relates to a lithium secondary battery, and more particularly, to a lithium secondary battery with improved safety and reliability using a gel electrolytic solution.

2. Description of the Related Art

A lithium secondary battery generates electricity by lithium ions reciprocating between a cathode and an anode. The lithium secondary battery has a high energy density relative to the unit volume and voltage thereof as compared to a Ni—Cd battery or a Ni—H battery. In addition, the weight of the lithium secondary battery is approximately half that of the Ni—Cd battery or the Ni—H battery. Thus, the lithium secondary battery is suitably used for small size, light-weight, long-lasting electronic devices.

As described above, lithium secondary batteries have attracted particular attention because of their excellent characteristics, such as high voltage characteristics, improved charging/discharging cycle characteristics and environmentally benign characteristics and so on when compared to conventional Ni—Cd batteries or Ni—H batteries. However, since lithium secondary batteries can be highly explosive under certain conditions, safety is a critical issue for the practical use of the lithium secondary batteries.

Lithium secondary batteries are classified according to the type of electrolyte used. Specifically, lithium secondary batteries are classified into lithium ion batteries using a liquid electrolyte and lithium ion polymer batteries using a polymer electrolyte.

The lithium ion battery generally utilizes a cylindrical case or a rectangular case as a case for hermetically sealing the electrode assembly. However, recently, a greater attention has been paid to a method in which a pouch is used instead of the case because the use of the pouch increases energy density per unit weight or volume and allows attainment of small, lightweight batteries at low cost.

FIG. 1 is an exploded perspective view of a conventional lithium ion battery using a pouch as a case. Referring to FIG. 1, a lithium ion battery includes an electrode assembly 10 that includes a cathode 11, an anode 12 and a separator 13. A case 9 hermetically seals the electrode assembly 10. Here, the electrode assembly 10 is formed by interposing the separator 13 between the cathode 11 and the anode 12 and winding the structure. A cathode tap 15 and an anode tap 15a serve as electrical paths between the electrode assembly 10 and the exterior. The taps 15, 15a are drawn from the cathode 11 and the anode 12 to form electrode terminals 14 and 14a.

FIG. 2 is an exploded perspective view illustrating a conventional lithium ion polymer battery. Referring to FIG. 2, a lithium ion polymer battery includes an electrode assembly 21 and a case 22 to hermetically seal the electrode assembly 21. Electrode terminals 24 and 24a serve as electrical paths to induce the current formed at the electrode assembly 21 to the exterior. The terminals 24, 24a are correspondingly connected to a cathode tap 23 and an anode tap 23a to then be exposed by a predetermined length outside the case 22.

As described above, in the lithium ion battery shown in FIG. 1 and the lithium ion polymer battery shown in FIG. 2, the electrode assemblies 10 and 21 are put into the cases 9 and 22, respectively, and an electrolyte solution is inserted thereinto. Only parts of the electrode terminals 14 and 14a and 24 and 24a are exposed to the exterior of the cases 9 and 22. Then, heat and pressure are applied to each resultant structure so that thermally adhesive materials at the edges of the upper and lower case parts cause the upper and lower case parts to adhere together to then be hermetically sealed, thereby completing the battery.

The lithium ion battery using the liquid electrolyte shown in FIG. 1 may experience leakage when the case 9 is damaged due to an external impact. Also, the electrode assemblies or pouches may be swollen due to evaporation of an organic solvent having a low boiling point.

To solve this problem, there have been proposed several methods of preparing batteries in which a solid or a gel-state electrolyte instead of a liquid electrolyte is coated on electrode plates, or a mixture of a liquid electrolyte and a polymerizable or crosslinkable monomer or polymer is cast on an electrode surface and hardened using ultraviolet rays, electron beams or heat as disclosed in U.S. Pat. Nos. 5,972,539, 5,279,910, 5,437,942 and 5,340,368. In practical application of the proposed methods, however, the preparation process is complicated and the battery performance is still not satisfactory.

SUMMARY OF THE INVENTION

To solve the above and other problems, it is an object of the present invention to provide a polymer electrolyte that effectively suppresses swelling due to an electrolyte solution and increases leakage resistance to improve the reliability and safety of the battery.

It is an another object of the present invention to provide a lithium secondary battery containing the polymer electrolyte.

Additional objects and advantages of the invention will be set forth in part in the description which follows and, in part, will be obvious from the description, or may be learned by practice of the invention.

The present invention provides a polymer electrolyte according to an embodiment of the invention that is prepared by polymerizing a composition including 0.1 to 90% by weight of a first compound represented by formula 1, a second compound represented by formula 2 or a mixture of the first and second compounds, 0.1 to 90% by weight of a third compound represented by formula 3, and 9.8 to 99.8% by weight of a nonaqueous organic solvent containing 0.5 to 2.0 M lithium salts, where:

Formula 1 is CH(R1)=C(R2)—C(=O)O—R3-N(R4)(R5),

Formula 2 is CH(R1)=C(R2)—C(=O)O—R3-CN, and

Formula 3 is Z—{—Y—X—C(R2)=CH(R1)}n.

According to another embodiment of the invention, R1 and R2 can be the same or different and are selected independently from the group consisting of hydrogen, C1 to C10 alkyl, fluorinated C1 to C10 alkyl, C6 to C14 aryl, and fluorinated C6 to C14 aryl.

According to yet another embodiment of the invention, R3 is selected from the group consisting of

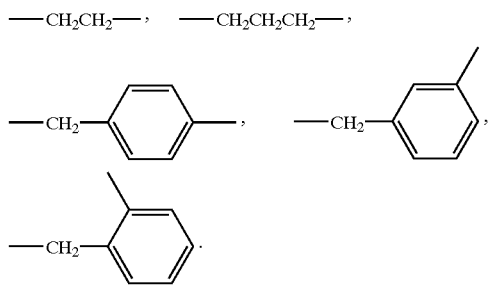

According to still another embodiment of the invention, R4 and R5 are selected from the group consisting of

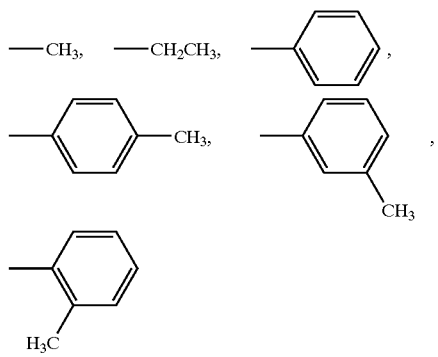

in which R4 and R5 are the same or different.

According to still yet another embodiment of the invention, X is selected from the group consisting of

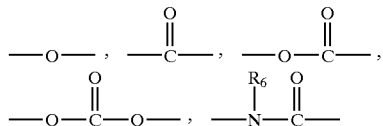

and Y is selected from the group consisting of

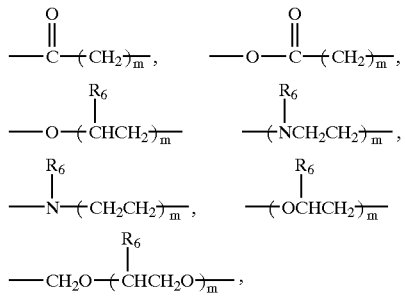

R6 is hydrogen, methyl, ethyl, propyl or butyl group, m is an integer in the range of from 0 to 10 inclusive, n is an integer in the range of from 1 to 6 inclusive, and Z has the following structure according to the n value:

Z is H, or C1 to C12 alkyl group when n=1;

Z is selected from the group consisting of

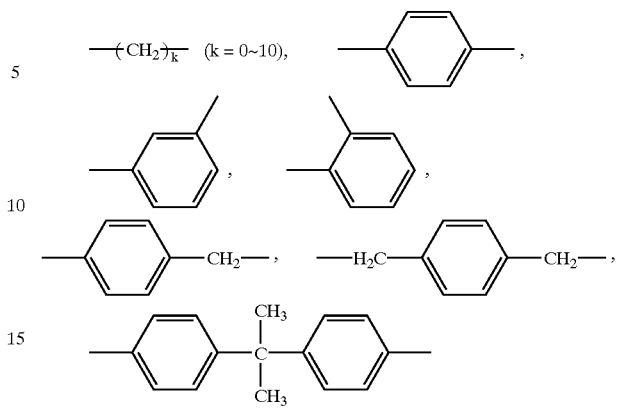

when n=2.

According to a further embodiment of the invention, Z is selected from the group consisting of

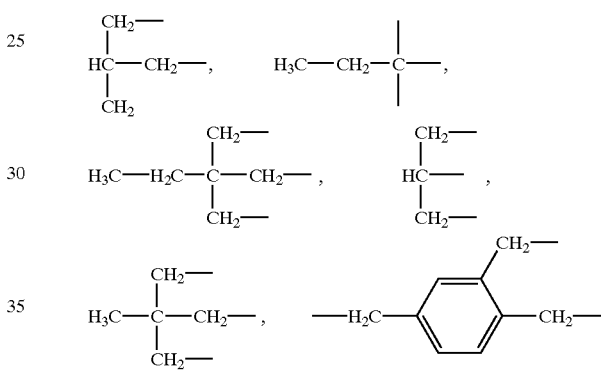

when n=3.

According to a still further embodiment of the invention, Z is selected from the group consisting of

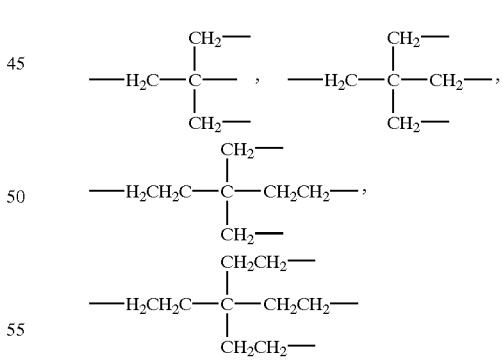

when n=4.

According to a yet further embodiment of the invention, Z is selected from the group consisting of

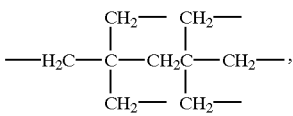

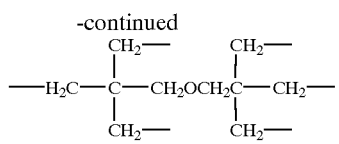

when n=5 or 6.

According to a yet still further embodiment of the invention, the polymerization may be selected from the group consisting of thermal polymerization, electron beam polymerization and UV polymerization, the polymerization temperature for the thermal polymerization is in the range of 20 to 100° C., and the wavelength of light for the UV polymerization is in the range of 200 to 400 nm.

According to an additional embodiment of the invention, benzophenone compounds such as benzophenone or substituted benzophenone are used as a polymerization initiator for the UV polymerization.

According to a yet additional embodiment of the invention, diacyl peroxides such as benzoyl peroxide, acetyl peroxide or lauroyl peroxide, azo compounds such as azobisisobutylonitrile (AIBN), azobis(2,4-dimethyl valeronitrile), azobis(cyclohexanecarbonitrile), or peroxy ester compounds such as t-butyl peroxy ester, t-amyl peroxybenzoate, peroxy carbonate compounds such as t-butyl peroxy isopropyl carbonate, t-butyl peroxy 2-ethylhexyl carbonate are used as a polymerization initiator for the thermal polymerization.

According to a still additional embodiment of the invention, no polymerization initiator is used for the electron beam polymerization.

According to yet still additional embodiment of the invention, when the UV polymerization or thermal polymerization is used, the composition further includes 0.1 to 10% by weight of the polymerization initiator, based on the total weight of the compounds represented by formulas 1, 2, and 3.

According to an additional embodiment of the present invention, a lithium secondary battery includes a cathode and an anode capable of accepting/releasing lithium ions, and a polymer electrolyte prepared by coating the composition of the present invention on one of the cathode and the anode and polymerizing the coated composition.

According to a yet additional embodiment of the present invention, the lithium secondary battery further includes a separator interposed between the cathode and the anode.

In accordance with a yet additional embodiment of the present invention, a lithium secondary battery includes a polymer electrolyte prepared by polymerizing the composition and disposed in a case incorporating a battery assembly having a cathode and an anode capable of accepting/releasing lithium ions, and a porous separator interposed between the cathode and anode.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
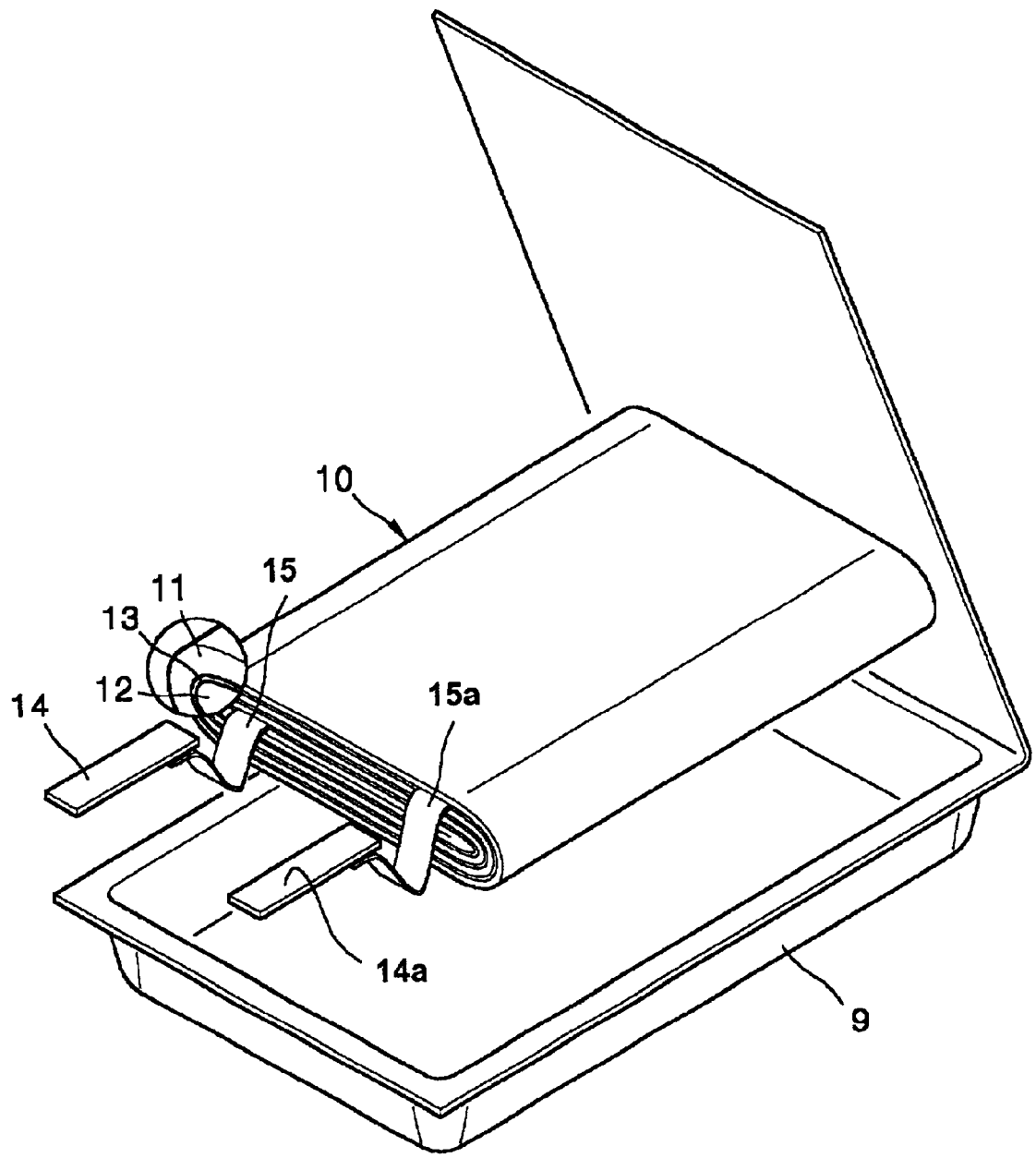
FIG. 1 is an exploded perspective view of a conventional lithium ion battery using a pouch as a case.
Figure 2:
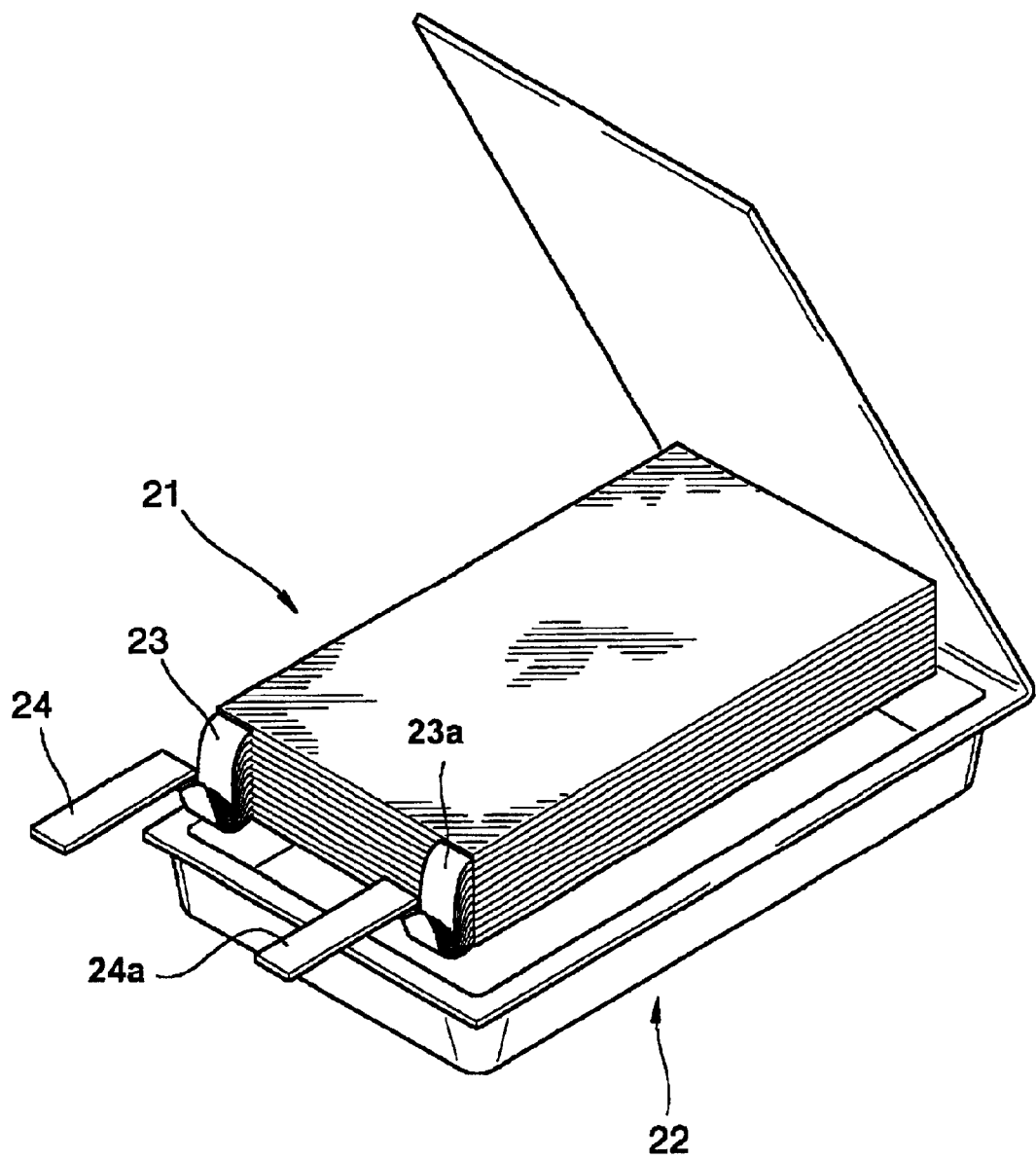
FIG. 2 is an exploded perspective view illustrating a conventional lithium ion polymer battery.

Reference will now be made in detail to the present preferred embodiments of the present invention, examples of which are illustrated in the accompanying drawings and specific examples, wherein like reference numerals refer to the like elements throughout. The embodiments are described below in order to explain the present invention by referring to the figures and specific examples.

A method of preparing a gel-type polymer electrolyte using a composition according to the present invention will now be described. A first compound represented by formula 1, a second compound represented by formula 2 or a mixture thereof is mixed with a third compound represented by formula 3 or a mixture of compounds represented by formula 3. A weight of the first and/or second compound is 0.1 to 90% by weight of the composition. The weight of the third compound is 0.1 to 90% by weight of the composition. The ratio is optimally determined in consideration of the electrochemical stability and performance of a prepared lithium secondary battery. Formula 1 is CH(R1)=C(R2)—C(=O)O—R3-N(R4)(R5), Formula 2 is CH(R1)=C(R2)—C(=O)O—R3-CN, and Formula 3 is Z—{—Y—X—C(R2)=CH(R1)}n.

R1 and R2 can be the same or different and are selected independently from the group consisting of hydrogen, C1 to C10 alkyl, fluorinated C1 to C10 alkyl, C6 to C14 aryl, and fluorinated C6 to C14 aryl. R3 is selected from the group consisting of

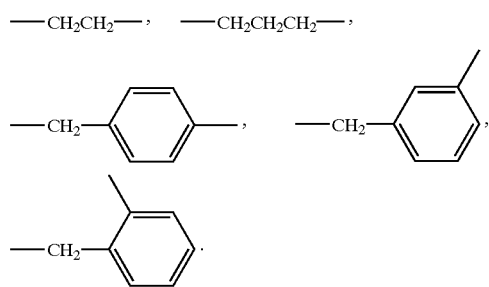

R4 and R5 are selected from the group consisting of

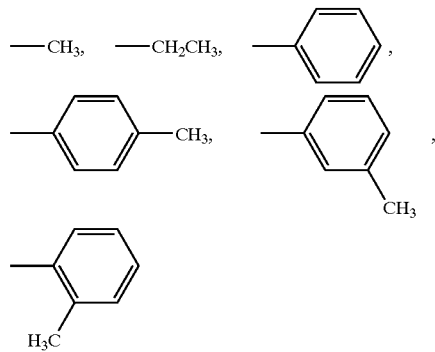

in which R4 and R5 are the same or different.

X is selected from the group consisting of

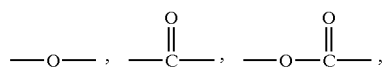

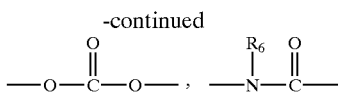

Y is selected from the group consisting of

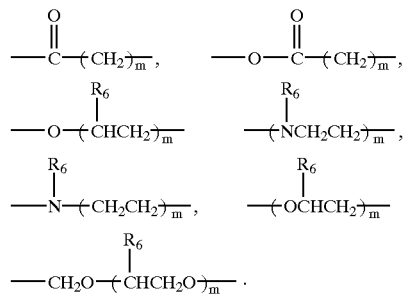

R6 is hydrogen, methyl, ethyl, propyl or butyl group, m is an integer in the range of from 0 to 10 inclusive, n is an integer in the range of from 1 to 6 inclusive, and Z has the following structure according to the n value:

Z is H or a C1 to C12 alkyl group when $n=1$;

Z is selected from the group consisting of

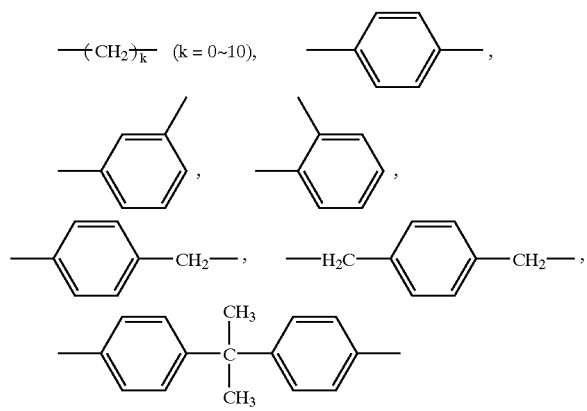

when $n=2$;

Z is selected from the group consisting of

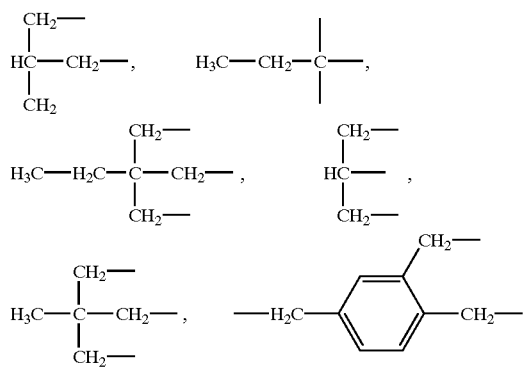

when $n=3$;

Z is selected from the group consisting of

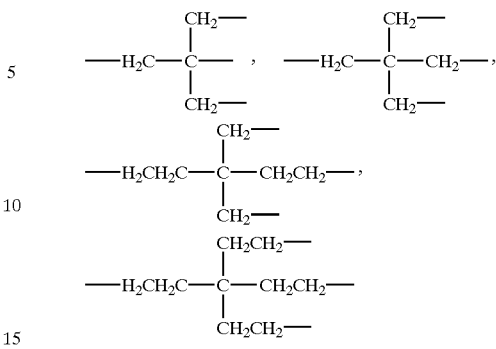

when $n=4$; and

Z is selected from the group consisting of

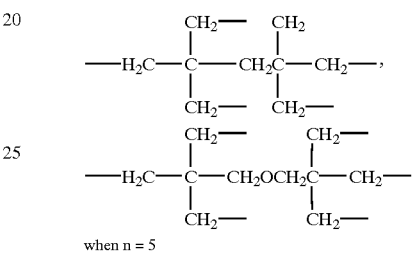

when n = 5 or 6.

According to an aspect of the invention, at least one polymerization initiator is added to the composition. The polymerization initiator is selected from the group consisting of benzophenone, benzoyl peroxide, acetyl peroxide, lauroyl peroxide and azobisisobutylonitrile (AIBN). However, the polymerization initiator is not required in all aspects of the invention.

An organic solvent containing 0.5 to 2 M lithium salts is further added to the composition, stirred and homogenously mixed.

The resultant mixture is polymerized through thermal polymerization, electron beam polymerization or UV polymerization to obtain a gel type electrolyte. The polymerization temperature for the thermal polymerization is 20 to 100° C. and the wavelength of light for the UV polymerization is 200 to 400 nm, although other temperatures and wavelengths may be used.

Any lithium salt and organic solvent forming an electrolyte solution may be used without specific restriction. However, in particular, the lithium salt is at least one selected from the group consisting of $LiClO_4$, $LiBF_4$, $LiPF_6$, $LiCF_3SO_3$, $LiAsF_6$, and $LiN(CF_3SO_2)_2$, and the organic solvent is preferably at least one selected from the group consisting of ethylene carbonate, propylene carbonate, dimethyl carbonate, methyl ethyl carbonate, diethyl carbonate, vinylene carbonate, triglyme, tetraglyme, fluorobenzene, difluorobenzene and y-butyrolactone.

A method of preparing a lithium secondary battery having the gel-type polymer electrolyte will now be described.

First, an electrode active material layer is formed on a current collector using an electrode active material composition comprising an electrode active material, a binder, a conductive agent, and a solvent. According to an embodiment of the invention, the electrode active material layer is formed such that the electrode active material composition is directly coated on the current collector. According to another embodiment, the electrode active material composition is coated on a separate support body, dried to form a film and then the film is peeled off from the support body and laminated on the current collector. The support body is any material that can support the active material layer, such as a mylar film or a polyethylene terephthalate (PET) film.

In the present invention, a lithium composite oxide such as $LiCoO_2$ is used as the electrode active material for a cathode and carbon or graphite is used as the electrode active material for an anode. As the conductive agent, carbon black or the like is used. Here, the content of the conductive agent is preferably 1 to 20 parts by weight based on 100 parts by weight of the electrode active material, e.g., $LiCoO_2$. However, it is understood that other active materials and conductive agents can be used.

As the binder, vinylidenefluoride-hexafluoropropylene (VdF/HFP) copolymer, polyvinylidenefluoride, polyacrylonitrile, polymethylmethacrylate and mixtures thereof are used. The content thereof is 1 to 30 parts by weight based on 100 parts by weight of the electrode active material. However, it is understood that other binders may be used.

All solvents used in conventional lithium secondary batteries can be used as the solvent. Detailed examples include acetone, N-methylpyrrolidone, acetonitrile and tetrahydrofuran.

The resulting composition is coated on the prepared cathode and anode active material layers, polymerized to prepare a cathode and an anode impregnated or coated with the gel-type polymer electrolyte. The cathode and the anode impregnated or coated with the gel-type polymer electrolyte are rolled by a jelly-roll method with or without interposition of the separator therebetween, thereby forming an electrode assembly. Alternatively, a bi-cell structure electrode assembly is formed by stacking the cathode, the anode and the separator interposed therebetween. Subsequently, the electrode assembly is put into a battery case and is hermetically sealed to complete the preparation of a lithium secondary battery according to the present invention.

Another method of preparing a lithium secondary battery having the gel-type polymer electrolyte according to another embodiment the present invention will now be described.

A cathode and an anode are prepared according to the method described above. The cathode and the anode, without being impregnated or coated with the gel-type polymer electrolyte, are rolled by a jelly-roll method with the interposition of the separator therebetween to form an electrode assembly. Alternatively, a bi-cell structure electrode assembly is formed by stacking the cathode, the anode and the separator interposed therebetween. Subsequently, the electrode assembly is put into a battery case and the gel-type electrolyte forming the composition is injected into the battery case. The case is then hermetically sealed. Thereafter, the obtained resultant structure is allowed to stand at an oven controlled at a predetermined temperature for a predetermined time. Generally, the temperature of the oven is maintained at roughly between 20 and 100° C.

The separator for use in the lithium secondary battery according to the present invention is not specifically limited. Examples of usable separators include an easily windable polyethylene (PE) separator, a polypropylene (PP) separator, a PP/PE bilayer separator, a PP/PE/PP or PE/PP/PE trilayer separator, a polyvinylidenefluoride separator or a poly(vinylidenefluoride/hexafluoropropylene) copolymer separator.

In such a manner, a gel-type polymer electrolyte can be obtained. Since the electrolyte exists in the form of gel, the electrolyte leakage outside the case does not readily occur so as to prevent a deterioration in the safety and reliability of the battery.

In preparing a battery by injecting the composition into a battery case and thermally polymerizing according to an embodiment of the invention, peroxides are preferred to azo compounds as a polymerization initiator. Azo compounds may generate inert gaseous nitrogen during thermal polymerization, which impedes the generation of a homogenous polymer electrolyte, which deteriorates the battery performance. Peroxides, and in particular, peroxy carbonate compounds, peroxy ester compounds or diacyl peroxide compounds, generate $CO_2$ gas, which is highly soluble in an electrolyte solution during thermal polymerization, which generates a homogenous polymer electrolyte. Also, $CO_2$ gas is known to form a stable passivation layer at an anode, thereby improving the battery performance. Thus, peroxides are preferably used as a thermal polymerization initiator.

However, except for a few peroxide compounds, peroxides compounds have an unfavorably high effective reaction initiating temperature at 100° C. or higher. Thus, in order to lower the effective reaction initiating temperature, an activator is preferably added to the peroxide compounds used as the polymerization initiator. Tertiary amine compounds are well known as activators. An initiator system using a peroxide compound and a tertiary amine compound is referred to as a redox initiation system, which has been widely used for self-curable acrylic resin.

The compound represented by formula 1 includes not only an unsaturated double bond causing polymerization, but also a tertiary amine group. Thus, it functions as a monomer and an activator at the same time during polymerization. Thus, the use of the compound represented by formula 1 allows a polymerization initiator working over a wide range of temperatures to be used. As compared to typical tertiary amine compounds, the compound represented by formula 1 is advantageously used because it becomes a part of a structural unit of a polymer matrix generated by polymerization. In contrast, after polymerization, the typical tertiary amine compounds exist independently rather than in the form of a part of structural unit of the polymer matrix. Thus, electrochemical decomposition may occur during charging/discharging of a battery, which may deteriorate battery performance. However, the compound represented by formula 1 is stable against electrochemical decomposition, thereby preventing deterioration of battery performance.

Conventionally, monomers having polyalkylene oxide such as polyethylene oxide or polypropylene oxide in their main chains and having functional groups such as acryl, vinyl or epoxy added to the main chains, have been typically used as gel-type polymer electrolyte forming monomers. However, the present invention is characterized in that the compound represented by formula 1 or 2 is used in addition to the monomers having polyalkylene oxide in their main chains in order to improve physical and electrochemical properties of a polymer electrolyte.

The present invention is described in greater detail below by referring to representative Examples. However, the representative Examples are only for the purposes of illustration and the present invention is understood not to be limited thereto.

EXAMPLE 1

15 g of polyvinylidenefluoride was added to 600 ml of N-methyl pyrrolidone and mixed using a ball mill for 2 hours to be dissolved. 470 g of $LiCoO_2$ and 15 g of carbon black (SUPER-P) were added to the resulting mixture and then mixed using a ball mill for 5 hours to form a cathode active material composition.

The cathode active material composition was coated on an aluminum foil having a thickness of 147 μm and a width of 4.9 cm using a doctor blade having a gap of 320 μm and dried to form a cathode plate.

An anode plate was manufactured as follows.

50 g of polyvinylidenefluoride was added to 600 ml of N-methyl pyrrolidone and mixed using a ball mill for 2 hours to be dissolved. 449 g of mesocarbon fiber (MCF) and 1 g of oxalic acid were added to the mixture and then mixed using a ball mill for 5 hours to form an anode active material composition. The anode active material composition was coated on a copper foil having a thickness of 178 μm and a width of 5.1 cm using a doctor blade having a gap of 420 μm, and then dried to form an anode plate.

Separately from the above, a PP/PE/PP trilayer separator was used as a separator. Here, the width of the separator was 5.25 cm and the thickness thereof was 18 μm. The trilayer separator was interposed between the cathode and anode plates, and wound by a jelly-roll method to form an electrode assembly. The electrode assembly was put into a pouch.

Then, 1 g of dimethylaminoethyl methacrylate, 3 g of polyethyleneglycol monoethylether methacrylate, 1 g of polyethyleneglycol dimethacrylate, 15 g of a mixed solution containing 1.3M $LiPF_6$ and EC/DEC mixed solvent (mixture ratio by volume of 1:1) and 0.06 g of AIBN were mixed to prepare a gel-type electrolyte forming composition. 3 g of the thus formed composition was injected into the pouch battery, and then hermetically sealed. The resultant structure was allowed to stand at an oven maintained at a temperature of approximately 75° C. for about 4 hours, thereby completing a lithium secondary battery.

COMPARATIVE EXAMPLE 1

A lithium secondary battery was prepared in the same manner as in Example 1, except that a mixture of 4 g of polyethyleneglycol monoethylether methacrylate, 2 g of polyethyleneglycol dimethacrylate, 15 g of a mixed solution containing 1.3 M $LiPF_6$ and EC/DEC mixed solvent(mixture ratio by volume of 1:1) and 0.06 g of AIBN was used in preparing a gel-type electrolyte forming composition.

EXAMPLE 2

A lithium secondary battery was prepared in the same manner as in Example 1, except that a mixture of 1 g of dimethylaminoethyl acrylate, 2.5 g of polyethyleneglycol monoethylether methacrylate, 0.5 g of ethoxylated trimethylolpropane triacrylate, 2 g of polyethyleneglycol dimethacrylate, 15 g of a mixed solution containing 1.3 M $LiPF_6$ and EC/DEC mixed solvent(mixture ratio by volume of 1:1) and 0.06 g of AIBN was used in preparing a gel-type electrolyte forming composition.

EXAMPLE 3

A lithium secondary battery was prepared in the same manner as in Example 1, except that a mixture of 2 g of cyanoethyl acrylate, 3 g of polyethyleneglycol monoethylether methacrylate, 1 g of polyethyleneglycol dimethacrylate, 15 g of a mixed solution containing 1.3 M $LiPF_6$ and EC/DEC mixed solvent(mixture ratio by volume of 1:1) and 0.06 g of AIBN was used in preparing a gel-type electrolyte forming composition.

EXAMPLE 4

A lithium secondary battery was prepared in the same manner as in Example 1, except that a mixture of 3 g of cyanoethyl acrylate, 3 g of polyethyleneglycol dimethacrylate, 15 g of a mixed solution containing 1.3 M $LiPF_6$ and EC/DEC mixed solvent(mixture ratio by volume of 1:1) and 0.06 g of AIBN was used in preparing a gel-type electrolyte forming composition.

EXAMPLE 5

The gel-type polymer electrolyte forming composition prepared in Example 1 was coated on the cathode plate prepared in Example 1, heated at approximately 85° C. for about 1 hour to prepare a cathode impregnated or coated with the gel-type polymer electrolyte. Then, a separator and an anode were disposed in the same manner as in Example 1, wound in a jelly-roll type method and hermetically sealed, thereby completing a lithium secondary battery.

EXAMPLE 6

A lithium secondary battery was prepared in the same manner as in Example 5, except for using benzophenone, instead of AIBN, and that UV (λmax=360 nm) radiation was used for 30 seconds in preparing a cathode impregnated or coated with a gel-type polymer electrolyte.

EXAMPLE 7

The gel-type polymer electrolyte forming composition prepared in Example 3 was coated on the cathode plate prepared in Example 3, heated at approximately 85° C. for about 1 hour to prepare a cathode impregnated or coated with the gel-type polymer electrolyte. Then, a separator and an anode were disposed in the same manner as in Example 1, wound in a jelly-roll type method and hermetically sealed, thereby completing a lithium secondary battery.

EXAMPLE 8

A lithium secondary battery was prepared in the same manner as in Example 5, except for using benzophenone, instead of AIBN, and that UV (λmax=360 nm) was used for 30 seconds in preparing a cathode impregnated or coated with a gel-type polymer electrolyte.

COMPARATIVE EXAMPLE 2

A lithium secondary battery was prepared in the same manner as in Example 1, except that a mixed solution containing 1.3 M $LiPF_6$ and EC/DMC/DEC mixed solvent (mixture ratio by volume of 3:3:4) was used instead of the gel type electrolyte forming composition and omitting the heating operation at approximately 75° C.

In the lithium secondary batteries prepared in Examples 1–8 and Comparative Examples 1 and 2, the battery reliability and safety were evaluated. To this end, the batteries were allowed to remain at a high temperature of approximately 90° C. for about 4 hours and were subjected to a leakage test by pressing the batteries with a pressure of 40 $kgf/cm^2$ for 10 seconds.

The evaluation tests showed that the reliability and safety of the lithium secondary batteries prepared in Examples 1–8 were better than those of the battery prepared by Comparative Examples 1 and 2. This is because the use of a gel-type polymer electrolyte according to the present invention prevents the electrolyte from being leaked outside or prevents the electrode assembly or pouch from being swollen due to the electrolyte. This prevents the lowering the reliability and safety of a battery.

Figure 3:
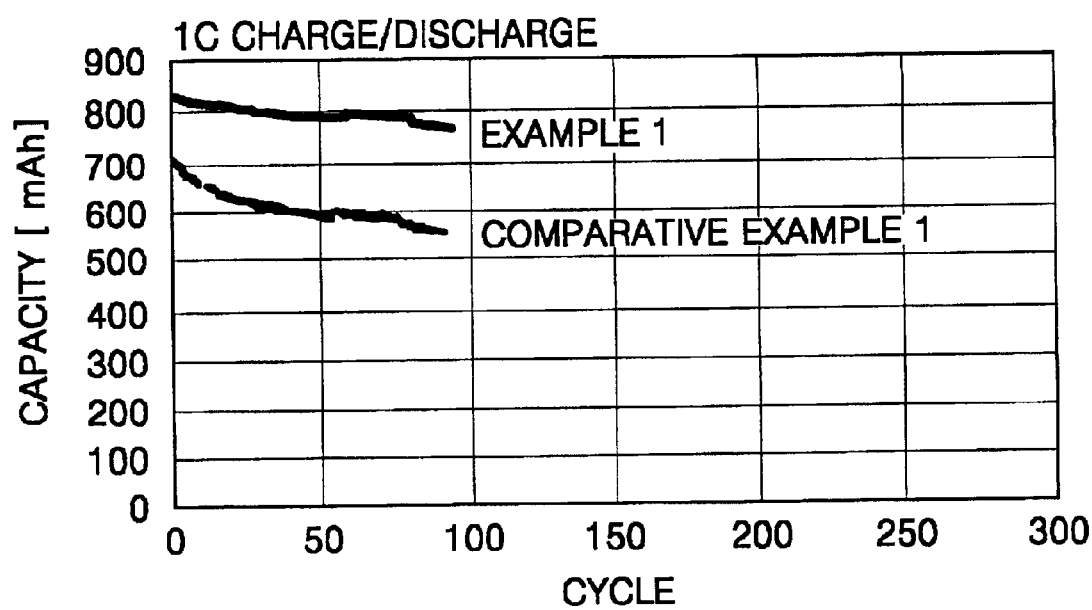
FIG. 3 is a graph showing 1C charge/discharge characteristics of lithium secondary batteries according to Example 1 of the present invention and Comparative Example 1.

FIG. 3 shows 1C charge/discharge characteristics of lithium secondary batteries according to Example 1 of the present invention and Comparative Example 1. Referring to FIG. 3, the battery prepared in Example 1 exhibits a much smaller decrease in the capacity than the battery prepared in Comparative Example 1.

According to the present invention, a lithium secondary battery using a gel-type polymer electrolyte has improved reliability and safety by effectively suppressing a swelling phenomenon and leakage that can occur using an electrolyte solution.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims and equivalents thereof.

What is claimed is:

1. A polymer electrolyte prepared by polymerizing a composition the composition comprising:

0.1 to 90% by weight of a first compound represented by formula 1, a second compound represented by formula 2 or a mixture of the first and second compounds;

0.1 to 90% by weight of a third compound represented by formula 3; and 9.8 to 99.8% by weight of a nonaqueous organic solvent containing 0.5 to 2.0 M of a lithium salt, wherein:
Formula 1 is CH(R1)=C(R2)—C(=O)O—R3-N(R4)(R5),
Formula 2 is CH(R1)=C(R2)—C(=O)O—R3-CN,
Formula 3 is Z—{—Y—X—C(R2)=CH(R1)}n,
R1 and R2 can be the same or different and are selected from the group consisting of hydrogen, C1 to C10 alkyl, fluorinated C1 to C10 alkyl, C6 to C14 aryl, and fluorinated C6 to C14 aryl,
R3 is selected from the group consisting of

—CH$_2$CH$_2$—, —CH$_2$CH$_2$CH$_2$—,

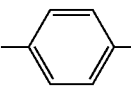

R4 and R5 are selected from the group consisting of

—CH$_3$, —CH$_2$CH$_3$, 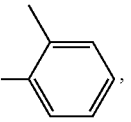

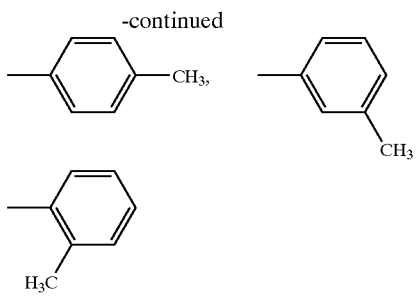

in which R4 and R5 are the same or different,
X is selected from the group consisting of

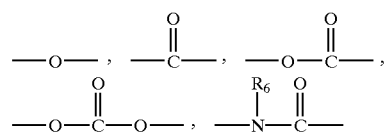

Y is selected from the group consisting of

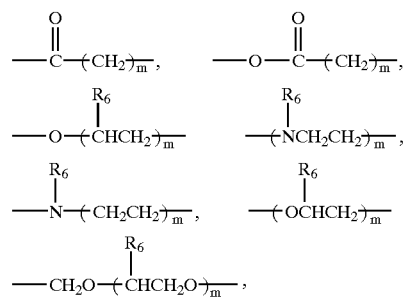

R6 is hydrogen, methyl, ethyl, propyl or butyl group,
m is an integer between 0 and 10 inclusive,
n is an integer between 1 and 6 inclusive, and
Z has the following structure according to the n value:
Z is H, a C1 to C12 alkyl group when n=1,
Z is selected from the group consisting of —(CH$_2$)$_k$— (k = 0~10),

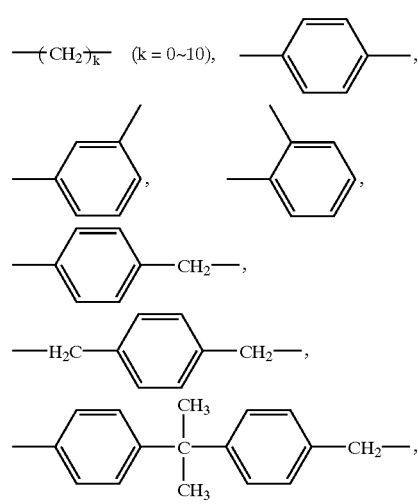

when n=2,

Z is selected from the group consisting of

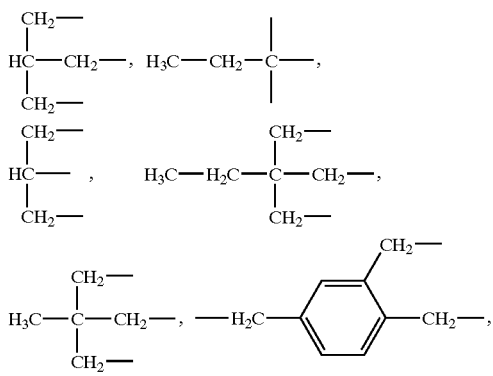

when n=3,
Z is selected from the group consisting of

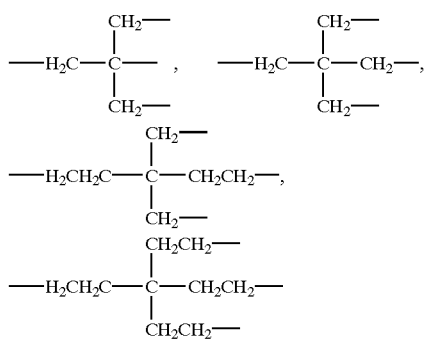

when n=4, and
Z is selected from the group consisting of

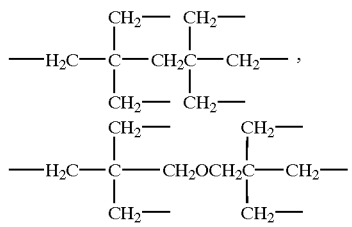

when n=5 or 6.

2. The polymer electrolyte according to claim 1, further comprising 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3.

3. The polymer electrolyte according to claim 2, wherein the benzophenone compounds are benzophenone or substituted benzophenone.

4. The polymer electrolyte according to claim 2, wherein the diacyl peroxide compounds are benzoyl peroxide, acetyl peroxide or lauroyl peroxide.

5. The polymer electrolyte according to claim 2, wherein the azo compounds are azobisisobutylonitrile (AIBN), azobis(2,4-dimethyl valeronitrile), or azobis (cyclohexanecarbonitrile).

6. The polymer electrolyte according to claim 2, wherein the peroxy ester compounds are t-butyl peroxy ester or t-amyl peroxybenzoate.

7. The polymer electrolyte according to claim 2, wherein the peroxy carbonate compounds are t-butyl peroxy isopropyl carbonate or t-butyl peroxy 2-ethylhexyl carbonate.

8. The polymer electrolyte according to claim 1, wherein the polymerization is selected from the group consisting of thermal polymerization, electron beam polymerization and UV polymerization.

9. The polymer electrolyte according to claim 8, wherein the polymerization temperature for the thermal polymerization is in the range of 20 to 100° C.

10. The polymer electrolyte according to claim 8, wherein the wavelength of light for the UV polymerization is in the range of 200 to 400 nm.

11. The polymer electrolyte according to claim 1, wherein the lithium salt is at least one selected from the group consisting of $LiClO_4$, $LiBF_4$, $LiPF_6$, $LiCF_3SO_3$, $LiAsF_6$, and $LiN(CF_3SO_2)_2$.

12. The polymer electrolyte according to claim 1, wherein the organic solvent is at least one selected from the group consisting of ethylene carbonate, propylene carbonate, dimethyl carbonate, methyl ethyl carbonate, diethyl carbonate, vinylene carbonate, triglyme, tetraglyme, fluorobenzene, difluorobenzene and y-butyrolactone.

13. A lithium secondary battery comprising:
    a cathode;
    an anode capable of accepting/releasing lithium ions with said cathode; and
    a polymer electrolyte prepared by coating the composition of claim 1 on one of said cathode and said anode and polymerizing the coated composition.

14. The lithium secondary battery according to claim 13, further comprising a separator interposed between said cathode and said anode.

15. A lithium secondary battery comprising:
    a case comprising a battery assembly comprising a cathode and an anode which accepts/releases lithium ions;
    a polymer electrolyte prepared by polymerizing the composition of claim 1 disposed in said case; and
    a porous separator interposed between the cathode and the anode.

16. The lithium secondary battery of claim 13, wherein the composition further comprises 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3.

17. The lithium secondary battery of claim 13, wherein the composition further comprises 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3, wherein the diacyl peroxide compounds are benzoyl peroxide, acetyl peroxide or lauroyl peroxide.

18. The lithium secondary battery of claim 13, wherein the composition further comprises 0.1 to 10% by weight of at least one polymerization initiator selected from the group consisting of benzophenone compounds, diacyl peroxide compounds, azo compounds peroxy ester compounds, and peroxy carbonate compounds, based on the total weight of the compounds represented by formulas 1, 2 and 3, wherein the azo compounds are azobisisobutylonitrile (AIBN), azobis(2,4-dimethyl valeronitrile), or azobis (cyclohexanecarbonitrile).

19. The lithium secondary battery of claim 13, wherein the composition further comprises 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3, wherein the peroxy ester compounds are t-butyl peroxy ester or t-amyl peroxybenzoate.

20. The lithium secondary battery of claim 13, wherein the composition further comprises 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3, wherein the peroxy carbonate compounds are t-butyl peroxy isopropyl carbonate or t-butyl peroxy 2-ethylhexyl carbonate.

21. The lithium secondary battery of claim 13, wherein the polymerization is selected from the group consisting of thermal polymerization, electron beam polymerization and UV polymerization.

22. The lithium secondary battery of claim 13, wherein the polymerization temperature for the thermal polymerization is in the range of 20 to 100° C.

23. The lithium secondary battery of claim 13, wherein the lithium salt is at least one selected from the group consisting of $LiClO_4$, $LiBF_4$, $LiPF_6$, $LiCF_3SO_3$, $LiAsF_6$, and $LiN(CF_3SO_2)_2$.

24. The lithium secondary battery of claim 15, wherein the composition further comprises 0.1 to 10% by weight of at least one polymerization initiator selected from the group consisting of benzophenone compounds, diacyl peroxide compounds, azo compounds, peroxy ester compounds, and peroxy carbonate compounds, based on the total weight of the compounds represented by formulas 1, 2 and 3.

25. The lithium secondary battery of claim 15, wherein the lithium salt is at least one selected from the group consisting of $LiClO_4$, $LiBF_4$, $LiPF_6$, $LiCF_3SO_3$, $LiAsF_6$ and $LiN(CF_3SO_2)_2$.

26. A gel-type polymer electrolyte, comprising:
a monomer having polyalkylene oxide in a main chain
functional groups including one of acryl, vinyl and epoxy added to the main chain; and
a compound represented by one of Formula 1 and 2, wherein:
Formula 1 is CH(R1)=C(R2)—C(=O)O—R3-N(R4)(R5),
Formula 2 is CH(R1)=C(R2)—C(=O)O—R3-CN,
R1 and R2 can be the same or different and are selected from the group consisting of hydrogen, C1 to C10 alkyl, fluorinated C1 to C10 alkyl, C6 to C14 aryl, and fluorinated C6 to C14 aryl, R3 is selected from the group consisting of

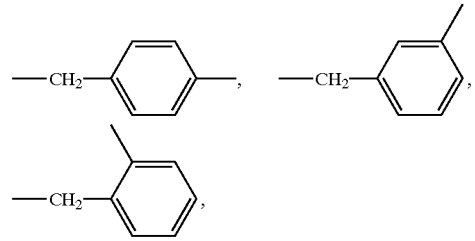

R4 and R5 are selected from the group consisting of

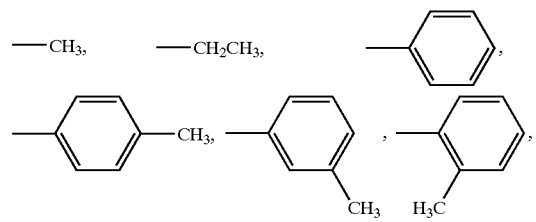

in which R4 and R5 are the same or different.

27. The gel-type polymer electrolyte of claim 26, wherein the polyalkylene oxide comprises one of a polyethylene oxide and polypropylene oxide.

28. The gel-type polymer electrolyte of claim 26, wherein said compound comprises a mixture of compounds represented by Formulas 1 and 2.

29. A lithium secondary battery comprising:
a cathode;
an anode capable of accepting/releasing lithium ions with said cathode; and
a polymer electrolyte having a polymerized composition of claim 1 and disposed between said cathode and said anode.

30. The lithium secondary battery of claim 29, wherein said polymer electrolyte is disposed between said cathode and said anode by coating the composition between said cathode and said anode and polymerizing the coated composition.

31. The lithium secondary battery of claim 29, further comprising a separator disposed between said anode and said cathode to form an electrode assemble, wherein said polymer electrolyte is disposed between said cathode and said anode by injecting the composition into the electrode assembly and polymerizing the composition.

* * * * *

UNITED STATES PATENT AND TRADEMARK OFFICE
CERTIFICATE OF CORRECTION

PATENT NO.    : 6,833,219 B2
DATED         : December 21, 2004
INVENTOR(S)   : Yong-beom Lee et al.

It is certified that error appears in the above-identified patent and that said Letters Patent is hereby corrected as shown below:

<u>Column 14,</u>
Lines 47-65, delete equation in its entirety and replace with the following:

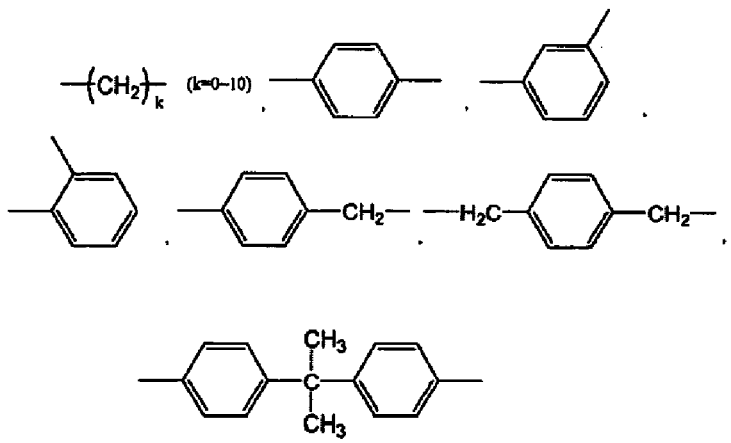

Signed and Sealed this

Seventh Day of June, 2005

JON W. DUDAS
*Director of the United States Patent and Trademark Office*